United States Patent [19]

Fall et al.

[11] 4,188,806
[45] Feb. 19, 1980

[54] TORSIONAL VIBRATION DAMPER ASSEMBLY

[75] Inventors: Don R. Fall, Oxford; Paul E. Lamarche, Utica, both of Mich.

[73] Assignee: Borg-Warner Corporation, Chicago, Ill.

[21] Appl. No.: 860,348

[22] Filed: Dec. 14, 1977

[51] Int. Cl.$^2$ .............................................. F16D 3/14
[52] U.S. Cl. .................... 64/27 C; 192/106.1; 192/106.2
[58] Field of Search ............... 64/27 C; 192/106.1, 192/106.2

[56] References Cited

U.S. PATENT DOCUMENTS

| 2,293,781 | 8/1942 | Thelander | 192/106.2 |
|---|---|---|---|
| 2,574,573 | 11/1951 | Libby | 192/106.2 |
| 2,674,863 | 4/1954 | Thelander | 64/27 C |
| 2,745,268 | 5/1956 | Reed | 192/106.2 |
| 3,327,820 | 6/1967 | Maurice | 192/106.2 |

FOREIGN PATENT DOCUMENTS

2248440  5/1975  France .................................. 192/106.2

*Primary Examiner*—Charles J. Myhre
*Assistant Examiner*—R. C. Turner
*Attorney, Agent, or Firm*—James A. Geppert

[57] ABSTRACT

A torsional vibration damper assembly for use in a torsional coupling between a driving member and a driven member wherein the damper assembly provides a very low rate, high amplitude deflection. The damper assembly includes a hub adapted to be connected to a driven shaft and provided with a pair of oppositely extending arms, a driving plate having a pair of driving members cooperating with the hub arms, a pair of floating equalizers journalled onto the hub, and a plurality of damping springs positioned between the arms of the equalizers, the hub arms and the driving members.

23 Claims, 14 Drawing Figures

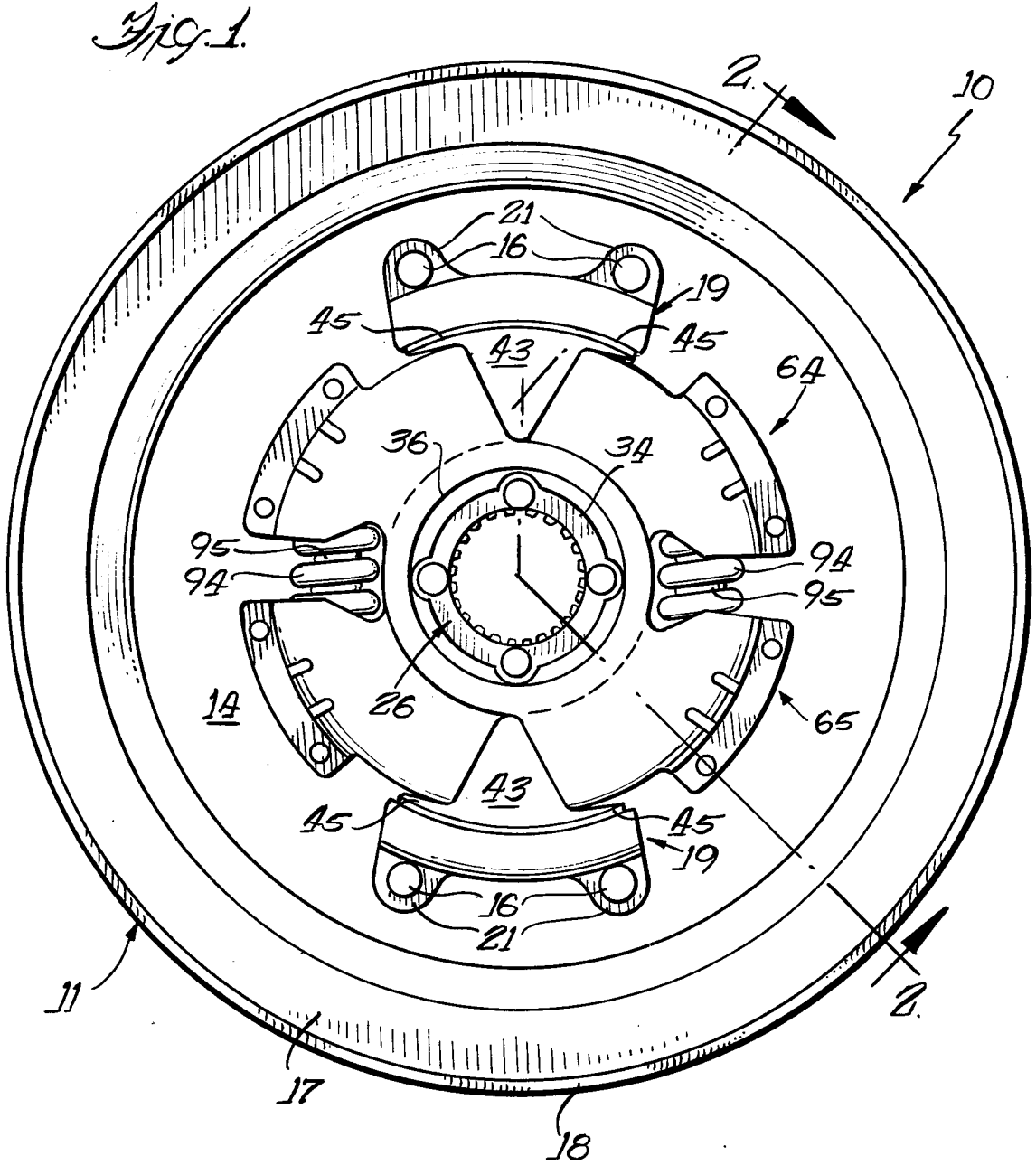

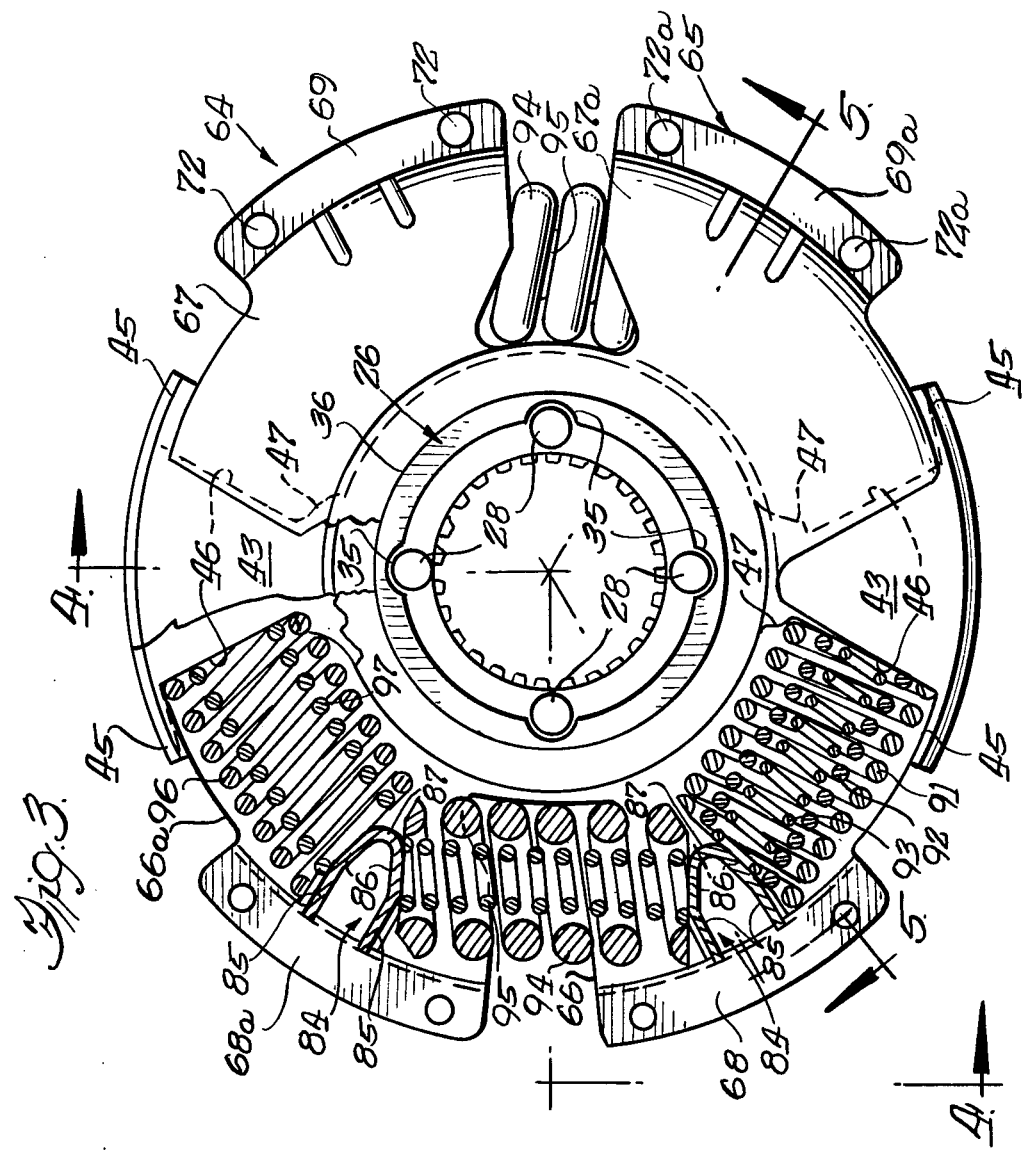
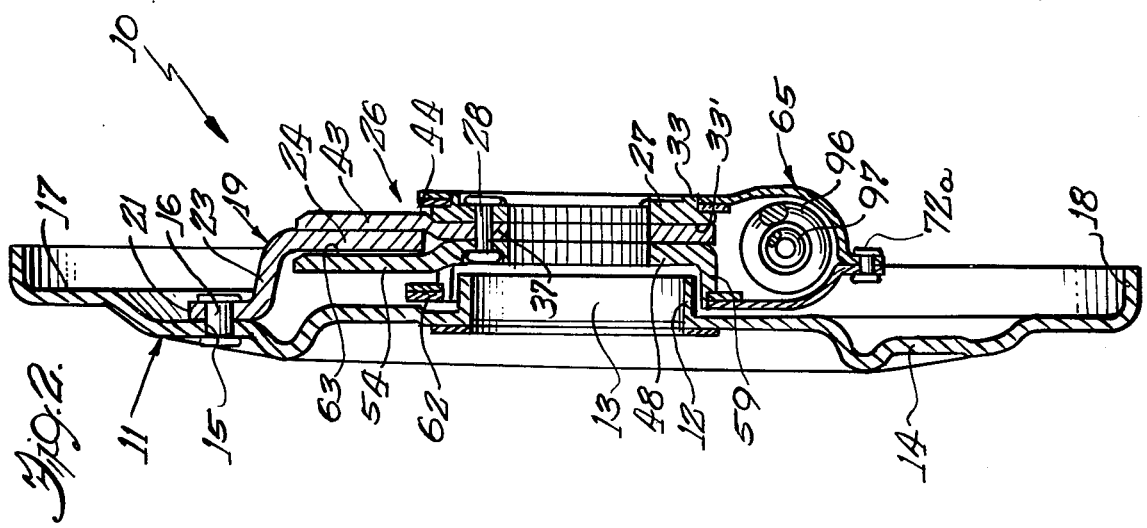

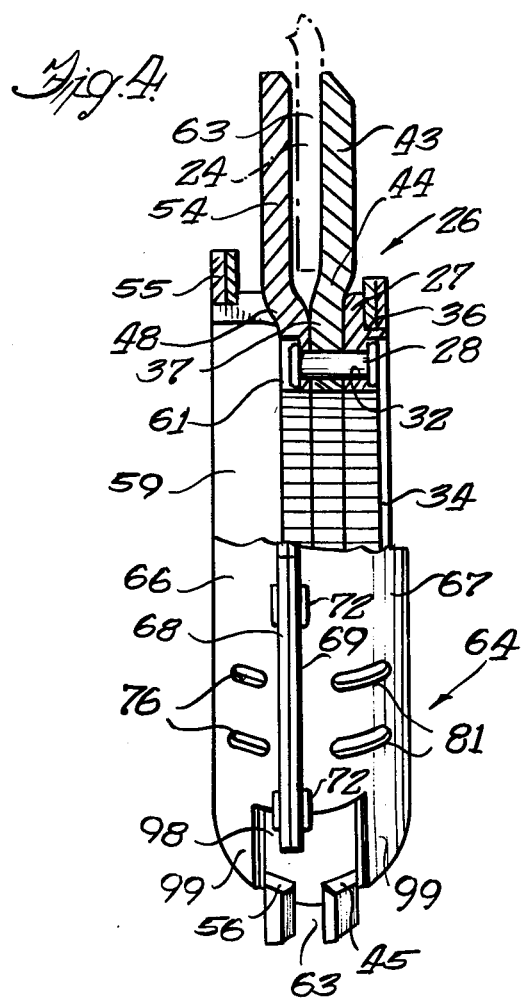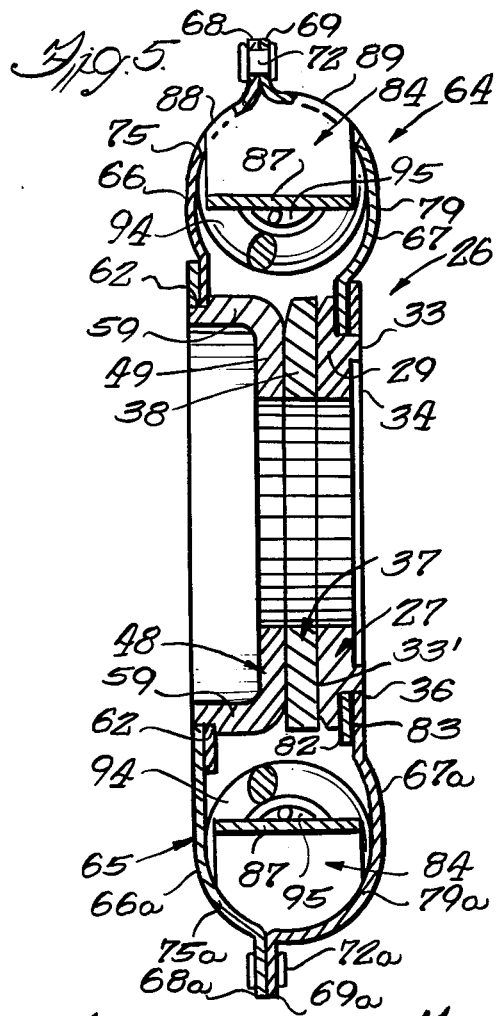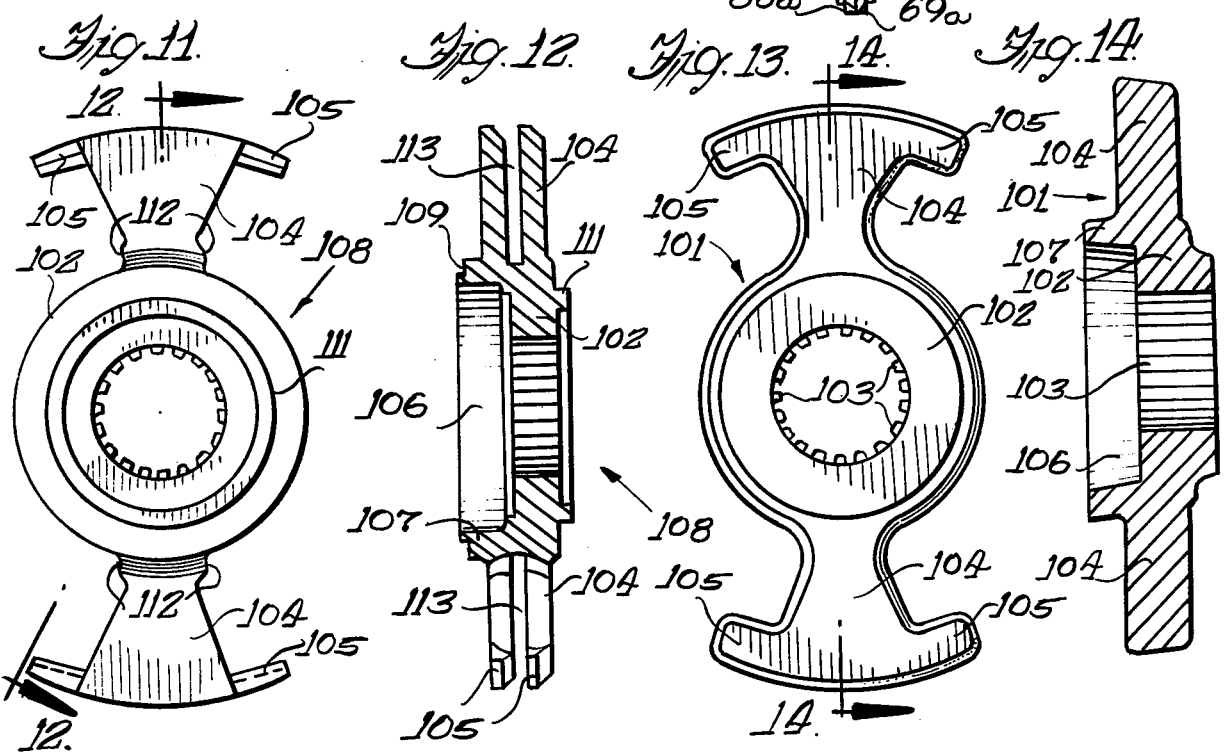

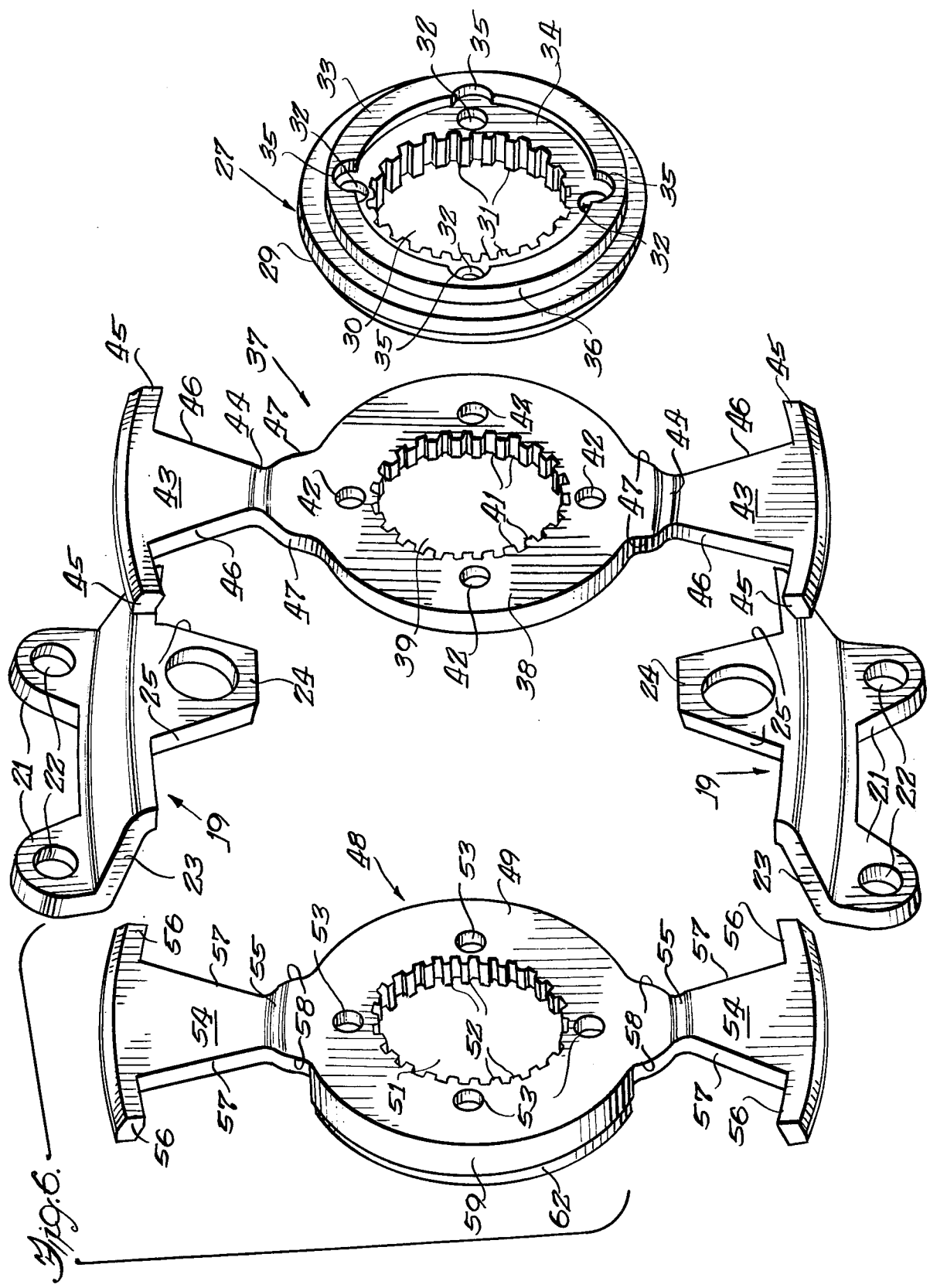

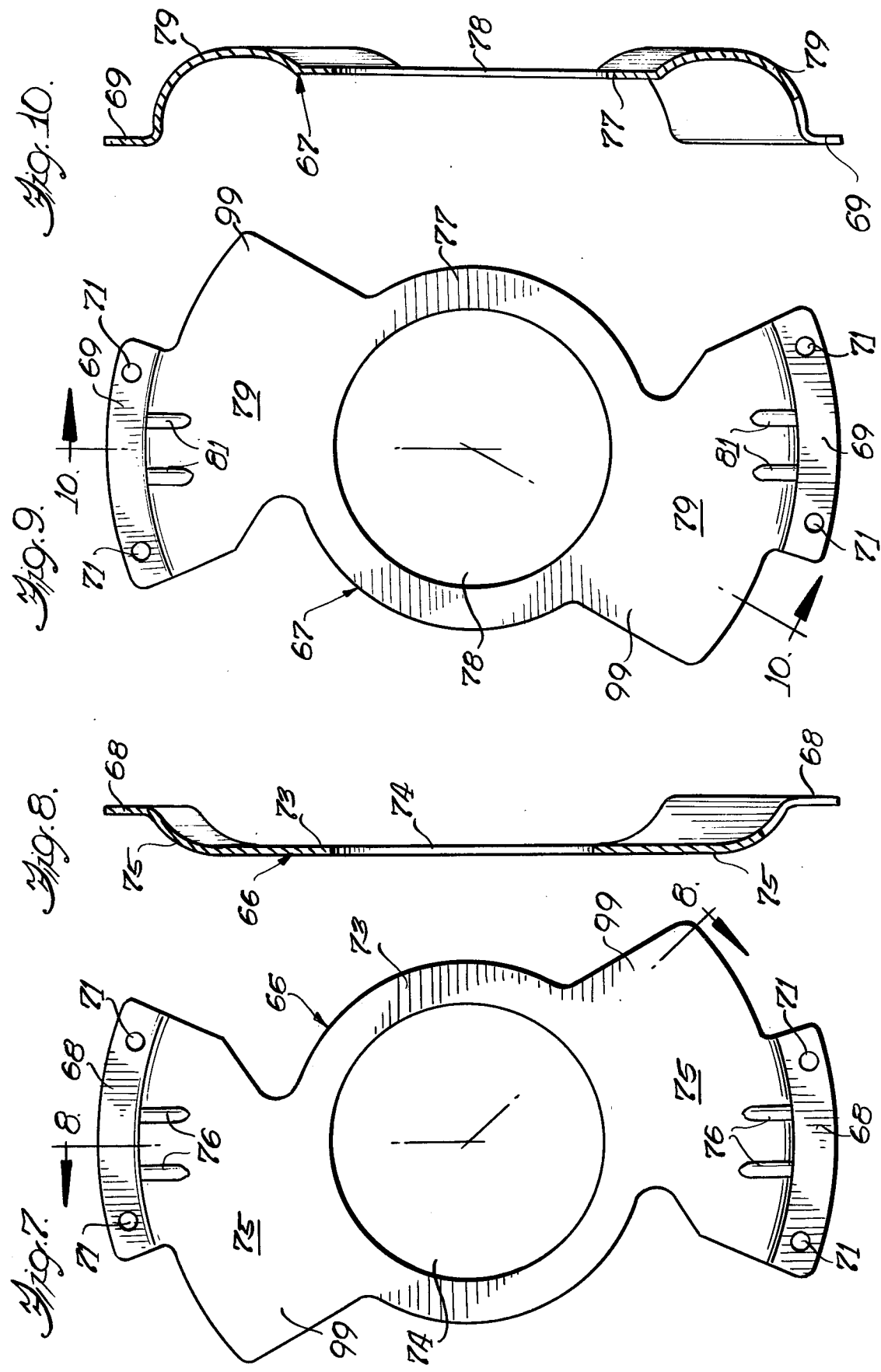

TORSIONAL VIBRATION DAMPER ASSEMBLY

BACKGROUND AND SUMMARY OF THE INVENTION

In the drive train of an automotive vehicle utilizing a manual transmission, a clutch assembly is interposed between the vehicle engine and the transmission, and a torsional vibration damper is conventionally utilized in the clutch assembly to neutralize any torsional vibrations emanating from the vehicle engine which would otherwise cause undesirable characteristics; e.g. impact loads, pulsations, noises, etc. in the transmission and driveline during operation of the vehicle.

Where an automatic transmission has a fluid coupling or hydraulic torque converter, the torsional vibrations in the system are effectively absorbed hydraulically and a vibration damper has been found unnecessary. However, in order to enhance the fuel economy of a vehicle equipped with an automatic transmission, a lock-up clutch may be incorporated into the fluid coupling or torque converter which, at a predetermined point that may relate to vehicle speed, load and acceleration, locks up to provide a direct drive between the fluid coupling input and output in high gear. When locked in direct drive, the torsional vibrations will not be hydraulically absorbed and a vibration damper may be required.

The present invention relates to an improved vibration damper assembly which provides for a relatively low rate, high amplitude deflection between the driving and driven members in a torsional coupling or clutch assembly. The assembly includes a hub having a pair of oppositely extending radial arms, a driving member having a pair of drive tangs cooperating with the hub arms, and a pair of floating equalizers journalled on the hub for rotation relative thereto. Damping springs are positioned between the hub arms and oppositely extending arms of the equalizers to provide an extended arc damping action; the drive tangs extending into the path of and engaging the damping springs at the hub arms.

The present invention also comprehends the provision of a vibration damper assembly wherein the equalizer arms provide an integral spring enclosure housing the opposite ends of the damper springs to prevent dislodgement of the springs and providing containment of the springs in the event of their failure. The equalizer arms also include internal spacers to separate the damper springs of adjacent spring sets. The spring spacers also serve to fix laterally the spring containment space as provided by the side plate of the equalizer arms.

The present invention further comprehends the provision of a vibration damper assembly having floating equalizers with arms that provide for the elimination of stress concentration points. The equalizer arms have generally straight or parallel sidewalls from the central portion journalled on the hub to the outer rounded arm portion providing the damper spring housing with the sidewalls terminating in peripheral flanges secured together.

The present torsional vibration damper assembly will be equally useful in a torsional coupling between axially aligned shafts, in a vehicle clutch for a manual transmission or in a lock-up clutch in combination with a hydraulic torque converter.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of the vibration damper assembly of the present invention with an associated drive member.

FIG. 2 is a cross sectional view of the damper assembly taken on the irregular line 2—2 of FIG. 1.

FIG. 3 is a rear elevational view, partly in cross section, of the vibration damper with the driving member omitted.

FIG. 4 is a side elevational view, partially in cross section, taken on the irregular line 4—4 of FIG. 3.

FIG. 5 is a cross sectional view taken on the irregular line 5—5 of FIG. 3.

FIG. 6 is an enlarged exploded perspective view of the hub assembly and drive tangs.

FIG. 7 is an elevational view of a front equalizer plate for a floating equalizer.

FIG. 8 is a cross sectional view taken on the irregular line 8—8 of FIG. 7.

FIG. 9 is an elevational view of a rear equalizer plate.

FIG. 10 is a cross sectional view taken on the irregular line 10—10 of FIG. 9.

FIG. 11 is a rear elevational view of an alternate form of forged hub.

FIG. 12 is a cross sectional view of the hub taken on the irregular line 12—12 of FIG. 11.

FIG. 13 is a rear elevational view of the forging from which the hub of FIGS. 11 and 12 is manufactured.

FIG. 14 is a vertical cross sectional view taken on the line 14—14 of FIG. 13.

DESCRIPTION OF THE PREFERRED EMBODIMENT

Referring more particularly to the disclosure in the drawings wherein is shown an illustrative embodiment of the present invention, FIGS. 1 and 2 disclose a vibration damper assembly 10 which may be utilized in a torsional coupling, vehicle clutch or lock-up clutch in a torque converter, and includes an input or driving member 11 of an irregular cross section, as seen in FIG. 2, with an annular flange 12 defining a central opening 13, an annular intermediate flat ring 14 having openings 15 for rivets 16 and an annular flat outer ring 17 which may have suitable friction material secured thereto or may be bolted to a radial flange of a driving shaft (not shown). Although shown with an annular peripheral flange 18, the outer portion of the member 11 could be a flat radial flange (not shown) for use in a vehicle clutch.

A pair of drive tangs 19, 19 are secured onto the flat ring 14 by the rivets 16, each drive tang including a base formed of a pair of spaced ears 21, 21 having openings 22 to receive the rivets 16, an offset portion 23, and an inwardly extending generally triangular projection 24 having inwardly converging edges 25, 25.

A hub 26 is a three-part composite which includes a hub barrel 27 and first and second hub plates 37 and 48, respectively, secured together by rivets 28. The hub barrel 27 includes a generally cylindrical body 29 having a central opening 30 with internal splines 31 and circumferentially spaced openings 32 for the rivets; one face 33 of the barrel being counterbored at 34 with spaced recesses 35 to receive the heads of the rivets 28. A shoulder 36 is formed on the face 33 radially outwardly of the counterbore 34 for a purpose to be later described, and the opposite face 33' of the barrel abuts the first hub plate 37.

The first hub plate 37 includes an annular flat body 38 having a central opening 39 splined at 41 and a plurality of openings 42 adapted to be aligned with the openings 32 of the hub barrel. Extending outwardly from the body 38 are a pair of oppositely disposed arms 43, 43 slightly offset at 44 from the body and terminating in a pair of oppositely extending arcuate projections or lips 45, 45. Each arm 43 has outwardly diverging edges 46, 46 generally complementary to the edges 25, 25 of a drive tang 19 and shouldered at 47 adjacent to the body 38.

The second hub plate 48 also has a generally annular flat body 49 with a central opening 51 splined at 52 and a plurality of openings 53 aligned with the openings 32 and 42 of the hub barrel 27 and first hub plate 37, respectively. A pair of oppositely disposed arms 54, 54 extend radially of but slightly offset at 55 from the body to terminate in circumferentially extending arcuate projections or lips 56; each arm having outwardly diverging edges 57 shouldered at 58 adjacent the body. Extending axially forwardly of the body 49 are a pair of oppositely disposed arcuate flanges 59, 59; each flange located at the periphery of the body 49 and extending substantially from the edge of one arm 54 to the edge of the opposite arm. Each opening 53 is counterbored at 61 (see FIG. 4) to receive the head of a rivet 28. Also the outer edges of the flanges 59 are formed with exterior shoulders 62 cooperating with floating equalizers.

To assemble, the hub barrel 27, first hub plate 37 and second hub plate 48 are sandwiched together in abutting relation and the rivets 28 are inserted through the aligned openings 32, 42 and 53 with the rivet heads positioned in the recesses 35, and the free ends of the rivets are swaged or headed in the counterbores 61 (see FIG. 4). The splines 31, 41 and 52 of the barrel and plates are axially aligned to receive the splined end of torque output means such as a drive shaft (not shown) to the transmission or other part to be rotated. As seen in FIGS. 2 and 4, the aligned arms 43 and 54 of the first and second plates are offset in opposite directions to provide a circumferential slot 63 receiving the generally triangular projection 24 of a drive tang 19. Also, the shoulder 35 on the hub barrel 27 has a smaller diameter than the diameter of the shoulders 62 on the arcuate flanges 59, 59.

Journalled on the shoulders 35 and 62 of the hub 26 are a pair of floating equalizers 64, 65 of substantially identical configuration. The equalizer 64 consists of a front equalizer plate 66 and a rear equalizer plate 67, the plates having complementary peripheral flanges 68, 69, respectively, with spaced openings 71, 71 to receive rivets 72 securing the plates together. The front plate 66 (see FIGS. 7 and 8) includes an annular flat central portion 73 having a central opening 74 adapted to be received on the shoulders 62 and a pair of oppositely disposed outwardly extending and inwardly curved arms 75, 75; each arm terminating in a peripheral flange 68 circumferentially offset from the center of the arm. Each arm is provided with a pair of spaced slots 76, 76 generally centrally positioned to and adjacent the peripheral flange 68 for a purpose to be later described.

The rear equalizer plate 67 (see FIGS. 9 and 10) also includes an annular flat central portion 77 having a central opening 78 adapted to be received on the shoulder 35 of the hub barrel and a pair of oppositely disposed outwardly extending and forwardly curved arms 79, 79; each arm terminating in a peripheral flange 69 circumferentially offset from the center of the arm. Each arm 79 has a greater arc of curvature than the facing arm 75 in the assembly, and a pair of spaced slots 81, 81 are generally centrally positioned of and adjacent to the flange 69 in each arm 79.

The equalizer 65 is substantially identical to equalizer 64 having a front equalizer plate 66a and a rear equalizer plate 67a joined at the peripheral flanges 68a, 69a by rivets 72a. When assembled, the equalizer plates 66, 67 are mounted on the shoulders 35, 62 at the outer faces of the hub 26 and the plates 66a, 67a are positioned on the shoulders 35, 62 outside of the plates 66, 67. A friction shim 82 is positioned between the plate portion 77 and the hub barrel 27 and a second friction shim 83 may be positioned between the plate portions 77 and 77a as necessary to meet friction lag requirements of the assembly.

Within each pair of equalizer arms 75, 79 is positioned a locking divider 84 formed of sheet metal with a pair of parallel legs 85, 85; the radially inner portions 86, 86 of the legs converging to a rounded end or intersection 87. Each leg includes a pair of spaced tabs 88, 89 (FIG. 5) at its free edge; the tab 88 being received in a slot 76 of the front equalizer plate 66 and the tab 89 being received in a slot 81 of a rear equalizer plate 67. The tabs are so designed as to snap into the slots when the equalizer plates 66, 67 are assembled together. The converging portions 86, 86 of the legs are oriented at different angles to the axis of the divider 84 so as to cooperate with the damper springs and provide parallel end surfaces for each spring set when the springs are compressed to their solid height.

Considering the damper assembly as shown in FIGS. 1 and 3, the barrel and plates of the hub 26 are secured together with rivets 28, and the drive tangs 19, 19 are riveted on the drive member 11 and positioned in the slots 63 formed between the hub arms 53, 54. The floating equalizers 64, 65 are journalled on the hub shoulders 36 and 62 and a series of damper springs are positioned within the damper assembly as seen in FIG. 3. The springs are divided into two groups acting in parallel with three sets of springs in each group acting in series. The highest rate springs are denoted as 91, 92 and 93 and are concentrically arranged in the spring pocket formed between the lower hub arms 43, 54 and the arms 75, 79 of the equalizer 64; the ends of the springs within the curved arms 75, 79 abutting a locking divider 84. The concentric springs 94, 95 are of an intermediate spring rate and are located in the pocket formed by the curved arms 75, 79 and 75a, 79a of the equalizers 64 and 65, respectively; the springs extending between the locking dividers 84, 84 in each equalizer. The lowest rate springs are the concentric springs 96, 97 located between the upper hub arms 43, 54 and the arms of the equalizer 65; one end of each spring engaging the locking divider 84 in equalizer 65.

Although shown and described as having varying spring rates, the spring sets may all have the same spring rate either by having identical spring sets or differing spring sets with the same spring rate. Also, sets of two concentric springs or three concentric springs may be used in each spring pocket or the sets may be mixed as shown. The springs having the various rates may be positioned in different pockets from that shown to provide varying damper characteristics. Although only shown for the left side of the damper assembly in FIG.

3, the same spring arrangement will be provided for the right hand half of the damper. Thus, the second group will comprise springs in diametrically opposite pockets having the same characteristics.

Considering the operation of the damper assembly, when a driving force or torque is applied to the driving member 11, the member moves the drive tangs 19, 19 from their positions within the slots 63, 63 to engage the spring sets 96, 97 having the lowest spring rate. Assuming the spring sets 94, 95 and 91, 92, 93 have higher rates, these springs will also be compressed, but to a lesser degree. As torque is increased, the springs 96, 97 are further compressed with the drive tangs 19 entering the slots 98 formed by the portions 99 of the curved arms 75a, 79a not extending to the periphery flanges 68a, 69a of the equalizer 65 until the springs 96, 97 reach their solid height.

During this time, the other springs are compressed to lesser degrees. When the springs 96, 97 reach their solid height, further increase in torque will cause the springs 94, 95 to be primarily compressed until these springs reach their solid height. Then, only the highest rate springs 91, 92, 93 are further compressed. Obviously, the maximum deflection need not be reached depending on the resistance to rotation of the hub by the torque output means or driven shaft. The torque is transferred from the drive tangs 19, 19 through the spring sets equalizers 64, 65 to the hub arms 43, 54 to rotate the hub 26 and driven shaft. The groups of springs in this assembly act in parallel and their loads are additive; while within each group the sets of springs act in series and are not additive. If the spring sets all have the same rate, then all of the spring sets will be compressed equally when torque is exerted by the drive tangs 19.

FIGS. 11 through 14 relate to an alternate form of hub that is forged in one piece. FIGS. 13 and 14 disclose the initial forging 101 consisting of an annular body 102 with a central opening splined at 103 and a pair of oppositely disposed arms 104, 104 terminating in arcuate tabs 105, 105. The front of the body is counterbored at 106 to define an annular flange 107. This forging is then machined to provide the hub 108 shown in FIGS. 11 and 12. The counterbore 106 is squared with the front shoulder 109 machined on the outer circumference of the flange 107. Also, the rear shoulder 111 is machined on the rear face of the hub and the arms 104, 104 and arcuate tabs 105, 105 are machined to a more accurate contour and shoulders 112, 112 provided on the arms adjacent the hub body 102. Finally, circumferentially extending radial slots 113, 113 are machined in the arms to terminate at the hub body 102. Obviously, the forged and machined hub operates in the same manner as the composite hub 26 previously described.

Although not specifically shown or described, it is obvious that the present damper assembly can be adapted to various other damper embodiments as shown in our copending U.S. patent application Ser. No. 801,989, filed May 31, 1977. As shown in our prior application, the present vibration damper assembly 10 can be utilized as a torsional coupling between a pair of axially aligned shafts, in a vehicle clutch to provide the driving friction disc, or in a lock-up clutch for a torque converter to provide a direct drive to the transmission. Also, the hub having two arms can be utilized with a single equalizer and two groups of springs having two spring sets in each group, or the hub could have three equidistant radial arms cooperating with three drive tangs and either a single equalizer with three radial arms or three equalizers, each having a single radial arm; such that there are two spring sets between adjacent hub arms. Furthermore, although described with one arrangement of spring rates for each group, the deflection characteristics for the damper may be varied depending on the choice of springs.

We claim:

1. A vibration damper assembly to transmit torque between driving and driven members, comprising an input member operatively associated with torque input means, a hub operatively connected to torque output means and having at least two radial arms, at least one floating equalizer journalled on said hub, resilient means interposed between said hub arms and said equalizer, and drive tangs secured to said input member and having offset inward projections extending into the path of and engaging said resilient means, each hub arm having a circumferentially extending slot therein receiving said drive tang projection, said equalizer providing substantially enclosed pockets for said resilient means.

2. A vibration damper assembly as set forth in claim 1, in which said hub includes a pair of diametrically oppositely extending hub arms having said circumferentially extending slots adapted to receive said drive tang projections, and a pair of shoulders on the opposite faces of the hub to journal said equalizer.

3. A vibration damper assembly as set forth in claim 1, in which said hub comprises a hub barrel, a first hub plate and a second hub plate suitably secured together, said plates having pairs of diametrically opposed axially aligned arms, the aligned arms of the plates being slightly offset in opposite directions to provide a circumferentially extending slot therebetween.

4. A vibration damper assembly as set forth in claim 3, in which said hub arms have outwardly diverging edges terminating in circumferentially extending lips, said hub barrel and plates having axially aligned internal splines.

5. A vibration damper assembly to transmit torque between driving and driven members, comprising an input member operatively associated with torque input means, a hub operatively connected to torque output means and including a hub barrel, a first hub plate and a second hub plate suitably secured together, said plates having pairs of diametrically opposed axially aligned arms, the aligned arms of the plates being slightly offset in opposite directions to provide a circumferentially extending slot therebetween and have outwardly diverging edges terminating in circumferentially extending lips, said hub barrel and plates having axially aligned internal splines, at least one floating equalizer journalled on said hub, said second hub plate including a pair of arcuate peripheral flanges extending axially from the plate and located between said arms, said arcuate flanges terminating in exterior shoulders to journal said equalizer, resilient means interposed between said hub arms and said equalizer, and drive tangs secured to said input member and extending into the path of and engaging said resilient means, said equalizer providing substantially enclosed pockets for said resilient means.

6. A vibration damper assembly as set forth in claim 2, in which said hub is a unitary member.

7. A vibration damper assembly as set forth in claim 2, in which said equalizer includes front and back generally parallel plates having central openings corresponding to the shoulders on the hub, each plate having a pair of generally diametrically disposed curved arms terminating in abutting peripheral flanges suitably secured together.

8. A vibration damper assembly to transmit torque between driving and driven members, comprising an input member operatively associated with torque input means, a hub operatively connected to torque output means and including a pair of diametrically oppositely extending hub arms having circumferentially extending slots therein, and a pair of shoulders on opposite faces of the hub, at least one floating equalizer journalled on said shoulders of said hub, said equalizer including front and back generally parallel plates having central openings corresponding to the shoulders on the hub, each plate having a pair of generally diametrically disposed curved arms terminating in abutting peripheral flanges suitably secured together, resilient means interposed between said hub arms and said equalizer, a divider in each equalizer arm to separate said resilient means, and drive tangs secured to said input member and extending into said slots and into the path of and engaging said resilient means, said equalizer providing substantially enclosed pockets for said resilient means.

9. A vibration damper assembly as set forth in claim 7, in which said curved arms provide generally enclosed pockets housing said resilient means.

10. A vibration damper assembly as set forth in claim 9, in which said peripheral flanges are laterally offset from the radial center of the arms.

11. A vibration damper assembly to transmit torque between driving and driven members, comprising an input member operatively associated with torque input means, a hub operatively connected to torque output means and including a pair of diametrically oppositely extending hub arms having circumferentially extending slots therein and a pair of shoulders on the opposite faces of the hub, at least one floating equalizer journalled on said shoulders of the hub, said equalizer including front and back generally parallel plates having central openings corresponding to said shoulders, each plate having a pair of generally diametrically disposed curved arms terminating in abutting peripheral flanges suitably secured together and laterally offset from the radial center of the arms, said curved arms providing generally enclosed pockets, said curved arms each having a pair of spaced slots adjacent and centrally located relative to said flange, and a divider having a pair of generally parallel legs terminating at their free ends in spaced tabs adapted to be received in said slots, resilient means interposed between said hub arms and dividers in said equalizer and housed in said pockets, and drive tangs secured to said input member and extending into said hub arm slots and into the path of and engaging said resilient means.

12. A vibration damper assembly as set forth in claim 11, in which the legs of said divider have converging portions terminating in a rounded intersection.

13. A vibration damper assembly as set forth in claim 12, in which said converging leg portions are oriented at different angles relative to the central axis of the divider.

14. A vibration damper assembly as set forth in claim 12, in which said resilient means comprises concentric spring sets extending between the hub arms and equalizer arms and abutting said dividers.

15. A vibration damper assembly as set forth in claim 9, in which the arms of said front plate have a lesser arc of curvature than the arms of said rear plate.

16. A vibration damper assembly as set forth in claim 1, in which said hub has a counterbored recess facing said input member, and said input member has an annular flange projecting into said recess.

17. A vibration damper assembly to transmit torque between driving and driven members, comprising an input member operatively associated with torque input means, a pair of drive tangs secured to said input member, a hub operatively connected to torque output means, said hub including a pair of diametrically oppositely disposed arms terminating in circumferentially extending lips, each arm having a circumferentially extending slot therein to receive a drive tang, a pair of shoulders on the opposite faces of said hub, a pair of floating equalizers journalled on said hub shoulders, each equalizer having a pair of generally parallel plates with generally diametrically opposed radial curved arms terminating in abutting peripheral flanges secured together, the flanges being offset laterally of the radial center of the equalizer arms, the arc of curvature of one arm of an axially aligned pair being greater than the arc of curvature of the facing arm, resilient means interposed between said hub arms and said equalizers, the curved arms forming a substantially enclosed pocket for said resilient means, each drive tang extending into the path of and engaging said resilient means, and a divider in each equalizer arm to separate said resilient means said resilient means comprising concentric spring sets received in said pockets between the hub arms and said equalizer arms.

18. A vibration damper assembly as set forth in claim 17, in which said hub is a composite of a hub barrel and first and second hub plates, means securing said barrel and plates together, said plates each having a pair of diametrically opposed radial arms slightly offset from its respective plate, the aligned pairs of arms of the plates being offset in opposite directions to provide the circumferentially extending slot therebetween, and a pair of arcuate flanges on the periphery of and extending forwardly of said second plate and having exterior shoulders formed thereon.

19. A vibration damper assembly as set forth in claim 17, in which said hub is an unitary member.

20. A vibration damper assembly as set forth in claim 1, in which a pair of floating equalizers are journalled on said hub, each equalizer having a pair of diametrically oppositely disposed radial arms, and said resilient means are disposed between said hub arms and said equalizer arms.

21. A vibration damper assembly as set forth in claim 20, including a divider in each equalizer arm to separate said resilient means.

22. A vibration damper assembly as set forth in claim 21, in which said resilient means comprise concentric spring sets received between said hub arms and said equalizer arms so as to provide two groups of spring sets acting in parallel with the spring sets in each group acting in series.

23. A vibration damper assembly as set forth in claim 22, in which said hub includes a pair of diametrically oppositely extending hub arms, each arm having a circumferentially extending slot therein to receive a drive tang projection.

* * * * *